March 6, 1973 W. R. BELL 3,719,241
FREE BREATHING LUBRICATION SYSTEM FOR SEALED BEARING ROCK BITS
Filed Nov. 24, 1971 3 Sheets-Sheet 1

INVENTOR:
WILLIAM R. BELL
Eddie E. Scott
ATTORNEY

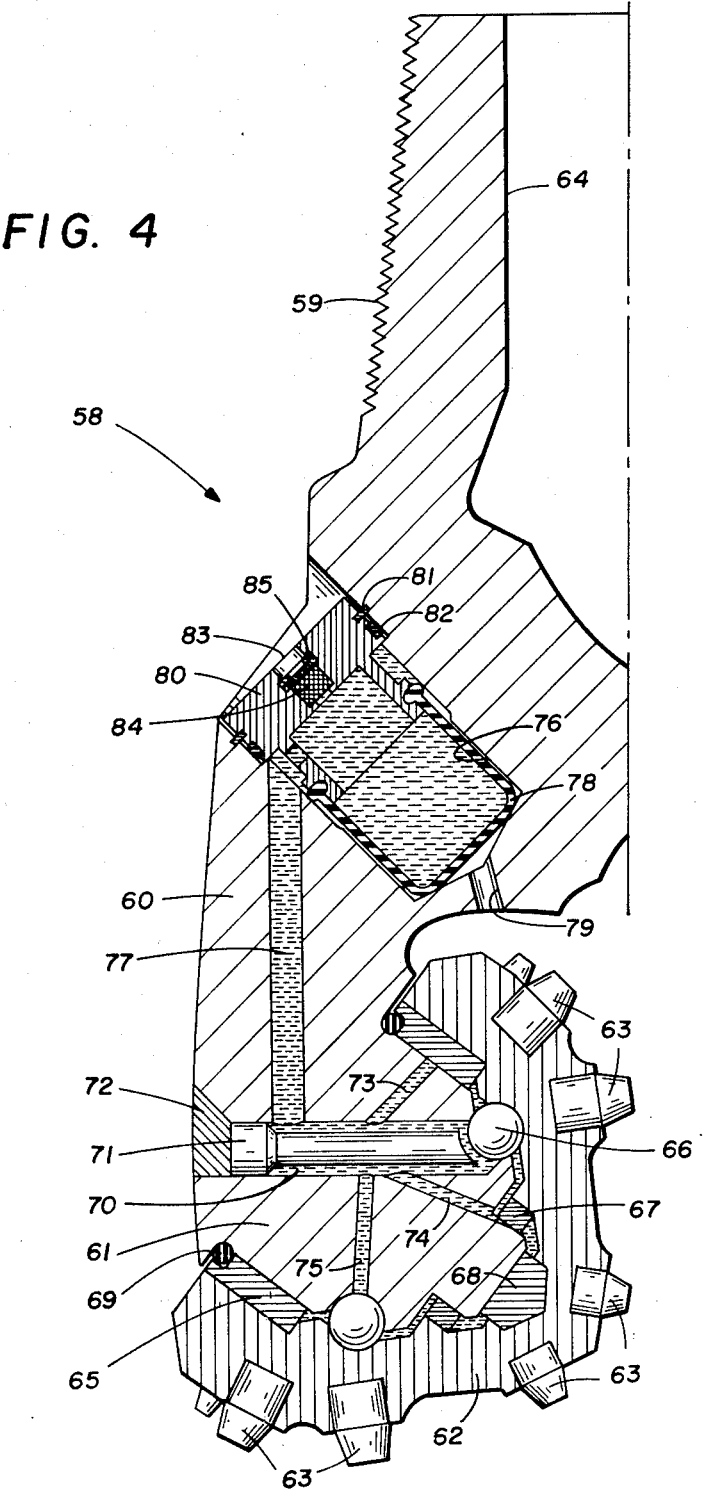

3,719,241
FREE BREATHING LUBRICATION SYSTEM FOR SEALED BEARING ROCK BITS
William Rex Bell, Dallas, Tex., assignor to Dresser Industries, Inc., Dallas, Tex.
Filed Nov. 24, 1971, Ser. No. 201,850
Int. Cl. E21b 9/08, 9/35; E21c 13/00
U.S. Cl. 175—228     26 Claims

ABSTRACT OF THE DISCLOSURE

Three individual lubricant reservoirs are positioned in a three cone rotary rock bit with one of the reservoirs in each of the three arms of the bit for supplying lubricant to the bit bearing systems located between each of the three individual cone cutters and the bearing shafts upon which they rotate. A seal is positioned between each of the cone cutters and its bearing shaft to prevent the lubricant from escaping into the borehole and to prevent borehole fluids and debris from entering the bearing area. A passageway extends from each of the lubricant reservoirs to the exterior of the bit and a free breathing porous filter plug is positioned in each of the passageways thereby equalizing the internal pressure of lubricant in the lubricant reservoir and the hydrostatic pressure of drilling fluid in the well bore.

BACKGROUND OF THE INVENTION

The present invention relates to the art of earth boring and more particularly to a system for equalizing pressures in the lubrication system of a rotary rock bit.

A rotary rock bit consists of a main bit body adapted to be connected to a rotary drill string. The bit includes at least one rotatable cone cutter mounted upon a bearing shaft extending from the main bit body. Bearing systems are provided between the cone cutter and the bearing shaft to promote rotation of the cutter and means are provided on the outer surface of the cone cutter for disintegrating the earth formations as the bit and the cutter rotate. A sufficient supply of lubricant must be provided to the bearing systems throughout the lifetime of the bit.

Problems have been encountered with prior art systems of supplying lubricant to the bearings because of the relatively long lifetime of modern bits and the wide variation of environmental conditions encountered during the driling operation. When a rotary rock bit is lowered into a well bore, the environmental pressure surrounding the bit increases at the rate of approximately ½ pound per square inch for each foot of depth. This means that at a depth of 10,000, the hydrostatic pressure on the outside of the bit could be 5,000 p.s.i. or more because of the weight of the drilling fluid in the well bore above the bit. In order for a lubrication system to function properly at the elevated down hole pressures, some means must be provided to equalize the internal pressure of the lubricant in the lubrication system with the hydrostatic pressure of the drilling fluid in the well bore. Failure to provide an effective pressure equalizing system in prior art rock bits has resulted in the destruction of one or more elements of the lubrication system. The elements of the lubrication system that have been the most susceptible to destruction in the prior art rock bits are the seal and the flexible diaphragm in the lubricant reservoir.

A wide variety of other environmental conditions also affect the performance of a pressure equalizing system. For example, the temperature will rise as the well bore penetrates deeper into the earth and temperatures in the range of 250° to 350° at 10,000 feet depth may be expected with even higher temperatures at greater depths. As the bit is rotated and the cone cutters engage the formations, a large amount of heat is generated causing the environmental temperature of the bit to rise. The elevated temperature has an adverse effect on the lubricant, the structural elements of the bit including the lubrication system, the pressure equalizing system and the bearings.

Vacillating pressure conditions, including the magnitude of vacillation, must also be considered when providing a pressure equalizing system. Periodic pressure variations are produced during the drilling operation and these pressure variations can damage the structural elements of the lubrication system and the pressure equalizing system. During drilling, joints of pipe must be added to the drill string for progressively deeper penetration. This may mean that 50 or 60 joints of pipe are added to the drill string during the normal life of a sealed bearing rotary rock bit. In order to add a joint of pipe, which is usually 30 feet in length, rotation of the bit must be stopped and the entire string of pipe, including the bit, must be raised high enough to allow the kelly to clear the rotary table (35–50 feet). Since operating costs of an oil well drilling rig are quite high, the time that the bit is off bottom and not drilling must be kept to a minimum. Therefore, the addition of a joint of pipe must be accomplished quickly and the drill string must be raised and lowered as rapidly as possible. This raising and lowering of the drill string creates pressure variations that affect the lubrication system and the pressure equalizing system.

When the bit is on bottom, the pressure of lubricant is the same as, or nearly the same as, the hydrostatic pressure of fluid in the well bore. However, as the drill string is elevated in the well bore, the bit body acts in much the same manner as a piston in a cylinder. The enlarged diameter of the bit body exerts a force on the column of fluid above it due to the velocity of the bit traveling up the well bore. The velocity of the fluid moving past the large diameter portion of the bit may be fairly high causing a low pressure area in the zone between the cutters and the main bit body where the seal is located. The pressure differential between the pressure of fluid in the area of the seal and the pressure of the lubricant inside of the bit may be in the order of 100 p.s.i. or more during periods of high acceleration of the drill string.

In a substantial number of sealed bearing rotary rock bits, the seals are designed to hold pressure in one direction only, that being from the outside of the bit to the inside. If the pressure on the inside of the bit reaches 50 to 75 p.s.i. greater than the pressure on the outside, the seals will in all probability leak. Thus, each time a joint of pipe is added to the drill string, the bit is elevated in the well bore causing a low pressure around the seal and forcing a portion of the lubricant out past the seal. The entire supply of lubricant may be pumped out in this manner resulting in a complete failure of the lubrication system and the inevitable failure of the bit.

In other sealed bearing rotary rock bits, seals are used that resist flow in both directions. An example of this type of seal is an O-ring seal. Bits using this type of seal also require a pressure equalizing system because a substantial pressure buildup within the lubrication system may be encountered. Some of the potential sources of the pressure buildup are the pressure differential between lubricant inside of the bit and the fluid in the well bore outside of the bit and thermal expansion of the lubricant caused by the elevated temperatures encountered during the drilling operation.

DESCRIPTION OF THE PRIOR ART

In U.S. Pat. No. 3,370,895 to G. A. Cason, Jr., patented Feb. 27, 1968, a sealed bearing rock bit with a lubricant reservoir is shown. A movable piston is positioned in the lubricant reservoir and the area above the piston is vented to the exterior of the bit to expose the upper side of the piston to the environmental pressure of the well bore. A seal is provided between each of the cutters and the arm upon which they are mounted. The seal retains the lubricant within the bearing area and prevents ambient fluid and any entrained materials from entering the bearing area.

In U.S. Pat. No. 3,476,195 to E. M. Galle, patented Nov. 4, 1969, a sealed bearing rock bit is shown that includes a lubricant reservoir and a flexible diaphragm for equalizing the internal pressure of the lubricant in the lubricant reservoir with the hydrostatic pressure of the drilling fluid in the well bore. A check relief valve is provided which operates at low pressures to permit flow out of the lubricant reservoir to the outside of the bit but blocks any flow in the reverse direction.

SUMMARY OF THE INVENTION

The present invention provides a free breathing lubrication system for a rotary rock bit. A lubricant reservoir is provided in the bit to supply lubrbicant to the bit bearings that promote rotation of the rotatable cutter. A seal between the bit body and the rotatable cutter retains lubricant in the bearing area and prevents materials in the borehole from entering the bearing area. A free breathing filter is provided in a passage that connects the lubricant reservoir with the exterior of the bit. In one embodiment of the invention a flexible diaphragm is positioned in the lubricant reservoir to divide the reservoir into a lubricant portion and a pressure equalizing portion. The free breathing filter is positioned to provide fluid communication between lubricant in the lubricant portion of the reservoir and fluid in the borehole.

It is therefore an object of the present invention to provide a lubrication system that will extend the useful lifetime of a rotary rock bit.

It is a further object of the present invention to provide a lubrication system for a sealed bearing rotary rock bit that will operate effectively under changing pressure conditions.

It is a still further object of the present invention to provide a sealed bearing rotary rock bit that includes a lubricant reservoir for supplying lubricant to the bearings and a free breathing filter positioned in a passageway extending from the reservoir to the external surface of the bit.

It is a still further object of the present invention to provide a lubricant reservoir pressure equalizer for a sealed bearing rotary rock bit.

It is a still further object of the present invention to provide a lubrication system for a sealed bearing rotary rock bit that will operate effectively with a sealing system that prevents flow in either direction.

It is a still further object of the present invention to provide a lubrication system for a sealed bearing rotary rock bit that will operate effectively with a sealing system that prevents flow in one direction.

It is a still further object of the present invention to provide a lubrication system for a sealed bearing rotary rock bit that includes a flexible diaphragm in a lubricant reservoir for dividing the reservoir into a lubricant portion and a pressure equalizing portion with a free breathing filter that provides fluid communication between lubricant in the lubricant portion and fluid in the borehole.

The above and other objects and advantages will become apparent from a consideration of the following detailed description of the invention when taken in conjunction with the accompanying drawings.

BRIEF DESCRIPTION OF THE DRAWINGS

FIG. 4 is a sectional view of one arm of a sealed bearing rotary rock bit illustrating an embodiment of the invention that includes a flexible diaphragm in the lubricant reservoir.

DETAILED DESCRIPTION OF THE INVENTION

Figure 1:
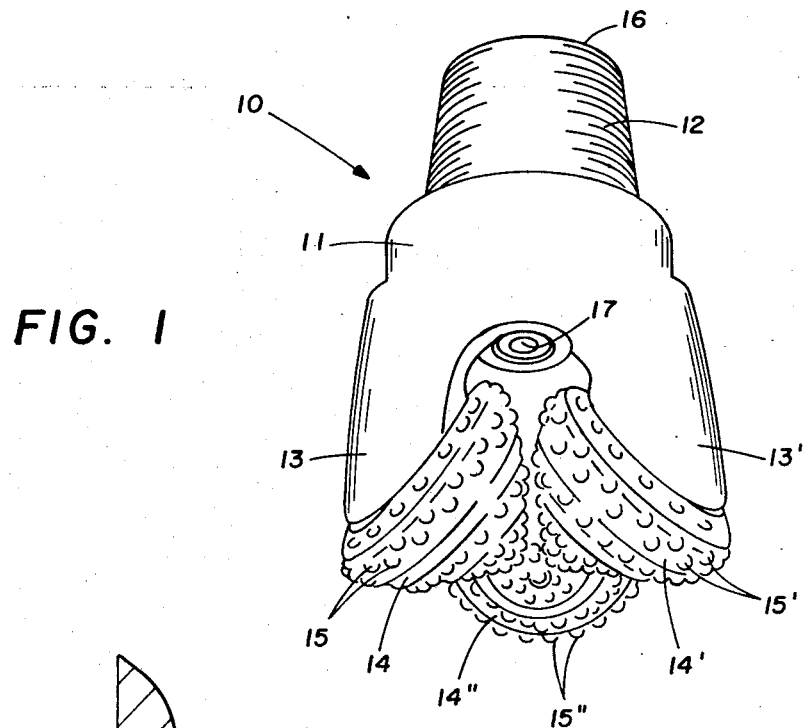
FIG. 1 shows a three cone sealed bearing rotary rock bit constructed in accordance with the present invention.

Referring now to the drawings, and to FIG. 1 in particular, shown therein and generally designated by the reference number 10 is a three cone sealed bearing rotary rock bit. As illustrated, the bit 10 includes a bit body 11 including an upper threaded portion 12. The threaded portion 12 allows the bit 10 to be connected to the lower end of a rotary drill string (not shown). Depending from the bit body 11 are three substantially identical arms with two of the arms, 13 and 13', being shown in FIG. 1. The lower end of each of the arms is provided with an extended journal portion and the details of this journal portion will be discussed subsequently. Three rotary cone cutters 14, 14', 14" are rotatably positioned on three bearing pins extending from the arms. Each of the cutters 14, 14', 14" includes cutting structure 15, 15', 15" on its outer surface adapted to disintegrate the formations as the bit 10 is rotated and moved downward. The cutting structure 15, 15', 15" is shown in the form of tungsten carbide inserts. However, it is to be understood that other cutting structures such as steel teeth may be used as the cutting structure on the cone cutters.

The bit 10 includes a central passageway 16 extending along the central axis of body 11 to allow drilling fluid to enter from the upper section of the drill string (not shown) immediately above and pass downward through three jet nozzles, one nozzle 17 being shown in FIG. 1, past the cutting structure 15, 15', 15" of the cone cutters 14, 14', 14". In use, the bit 10 is connected as the lower member of a rotary drill string (not shown) and lowered into a well bore until the cone cutters engage the bottom of the well bore. Upon engagement with the bottom of the well bore, the drill string is rotated, rotating bit 10 therewith. Drilling fluid is forced down through the interior passage of the rotary drill string and continues through the central passageway 16 of bit 10 passing through the nozzles past the cutting structure of the cutters to the bottom of the well bore, thence, upward in the annulus between the rotary drill string and the wall of the well bore carrying with it the cuttings and debris from the drilling operation.

Figure 2:
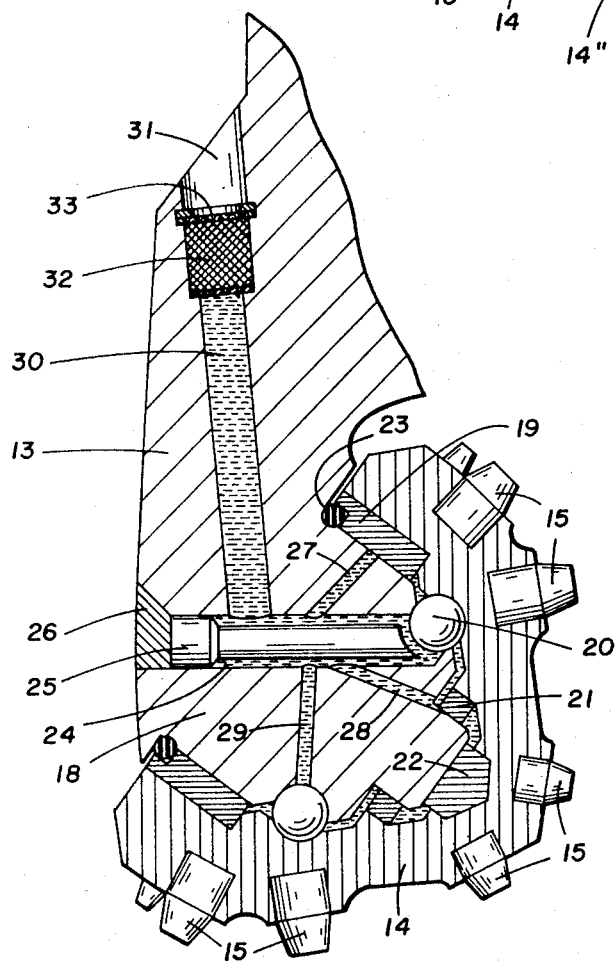
FIG. 2 is a sectional view of one arm of the bit of FIG. 1 showing the lubrication system.

Referring now to FIG. 2, a sectional view of one arm 13 of the bit 10 is shown. The cutter 14 is rotatably positioned on the journal portion of the arm 13 and adapted to disintegrate earth formations as the bit is rotated. The cutting structure 15 on the outer surface of cutter 14 contacts and disintegrates the formations in a manner that is well known in the art. The journal portion of arm 13 consists of a bearing pin 18 upon which the cutter 14 is mounted. A plurality of bearing systems are located in the bearing area between the cutter 14 and the bearing pin 18. The bearing systems in the bearing area include an outer friction bearing 19, a series of ball bearings 20, an inner friction bearing 21 and a thrust button 22. An O-ring seal 23 is positioned between the cutter 14 and the bearing pin 18. This seal retains lubricant in the bearing area around the bearing systems and prevents any materials in the well bore from entering the bearings. The O-ring seal 23 prevents fluid flow in either direction. A passageway 24 is provided to allow lubricant to be transmitted to the bearing systems. The passageway 24, as The structural details of the bit shown in FIG. 3 having been described, the operation of the bit will now be considered. The bit is lowered into a well bore until the cone cutter 37 engages the bottom of the well bore. Upon engagement with the bottom of the well bore, the drill string is rotated rotating the bit therewith. Drilling fluid is forced down through the interior passage of the rotary drill string and continues through the central passage 39 of the bit to the bottom of the well bore, thence, upward in the annulus between the rotary drill string and the wall of the well bore carrying with it the cuttings and debris from the drilling operation. Since the seal 44 is designed to hold pressure in one direction only, any relative pressure buildup of lubricant inside of the bit will cause flow from inside of the bit past seal 44 to the well bore. The free breathing porous filter plug 54 insures that the pressure of lubricant inside of the bit will be the same as the pressure of the fluid in the well bore proximate the bit and any substantial flow of fluid into or out of the bit is prevented.

An embodiment of the invention that includes a flexible diaphragm positioned in the lubricant reservoir of a sealed bearing rotary rock bit is shown in FIG. 4. The bit, generally designated by the reference number 58, includes an upper threaded portion 59 that allows the bit 58 to be connected to the lower end of a rotary drill string (not shown). The lower end of one of the arms 60 of the bit is provided with an extended journal portion in the form of a bearing pin 61. A rotary cone cutter 62 is rotatably positioned upon the bearing pin 61. The cutter 62 includes cutting structure 3 on its outer surface adapted to disintegrate the formations as the bit is rotated and moved downward. The cutting structure 63 is shown in the form of tungsten carbide inserts. However, it is to be understood that other cutting structures such as steel teeth may be used as the cutting structure on the cone cutters.

The bit 58 includes a central passageway 64 extending along the central axis of bit 58 to allow drilling fluid to enter from the upper section of the drill string (not shown) immediately above and pass downward through the bit 58 to the bottom of the well bore to flush cuttings and drilling debris from the well bore during the drilling operation. A multiplicity of bearing systems are located in the bearing area between the cutter 62 and the bearing pin 61. The bearing systems in the bearing area include an outer friction bearing 65, a series of ball bearings 66, an inner friction bearing 7 and a thrust button 68. An O-ring seal 69 is positioned between the cutter 62 and the bearing pin 61. This seal retains lubricant in the bearing area around the bearing systems and prevents any materials in the well bore from entering the bearings. The O-ring seal 69 prevents fluid flow in either direction. A passageway 70 is provided through the bearing pin 61 to allow lubricant to be transmitted to the bearing systems. The passageway 70, as shown, also allows the balls that make up the ball bearing system 66 to be inserted into position after the cone cutter 62 is placed on the bearing pin 61. The series of ball bearings 66 serves to lock the cone cutter 62 on bearings pin 61. After the balls are in place, a plug 71 is inserted into the passageway 70 and welded therein by weld 72. Plug 71 has a reduced diameter throughout the major portion of its length to allow lubricant to be transmitted to the bearing area. Additional passageways 73, 74 and 75 extend from passageway 70 to the bearing area to insure a sufficient supply of lubricant to bearings 65, 66, 67 and 68.

A lubricant reservoir 76 is located in the arm 60 to provide a supply of lubricant to the bearings. A passageway 77 connects the lubricant reservoir 76 with the passageway 70 to allow lubricant to be transmitted from reservoir 76 directly to the bearings. A flexible diaphragm 78 is positioned in the lubricant reservoir 76 and encloses the lower portion of the reservoir 76. The area within the lubricant reservoir 76 but outside of the diaphragm 78 is vented to the dome of the bit by a passageway 79 that connects the lower end of the lubricant reservoir 76 with the dome of the bit. The upper end of the lubricant reservoir 76 is closed by a cap 80 locked in place in the arm 60 by a snap ring 81. An O-ring seal 82 is positioned around the cap 80 to retain lubricant in the lubricant reservoir 76. A passageway 83 extends through the cap 80 providing communication between lubricant in the lubricant reservoir 76 and fluid in the well bore outside of the bit 58. A free breathing porous filter plug 84 is positioned in the passageway 83 and locked in place by a snap ring 85 that fits in a groove in the cap 80. The free breathing porous filter plug 84 provides a flow dampening effect that will restrict the penetration of turbulent fluids either into or out of the system. The plug 84 prevents any substantial amount of fluid flow into or out of the system in response to pressure demands an creates a dead-end trap whereby lubricant is retained inside of lubricant reservoir 76. The plug 84 may be constructed in any manner that will produce a porous and permeable plug. For example, the plug 84 may be constructed of sintered metal, of a porous ceramic material, of a screen or of other well known filter structures.

Figures 3, 5:
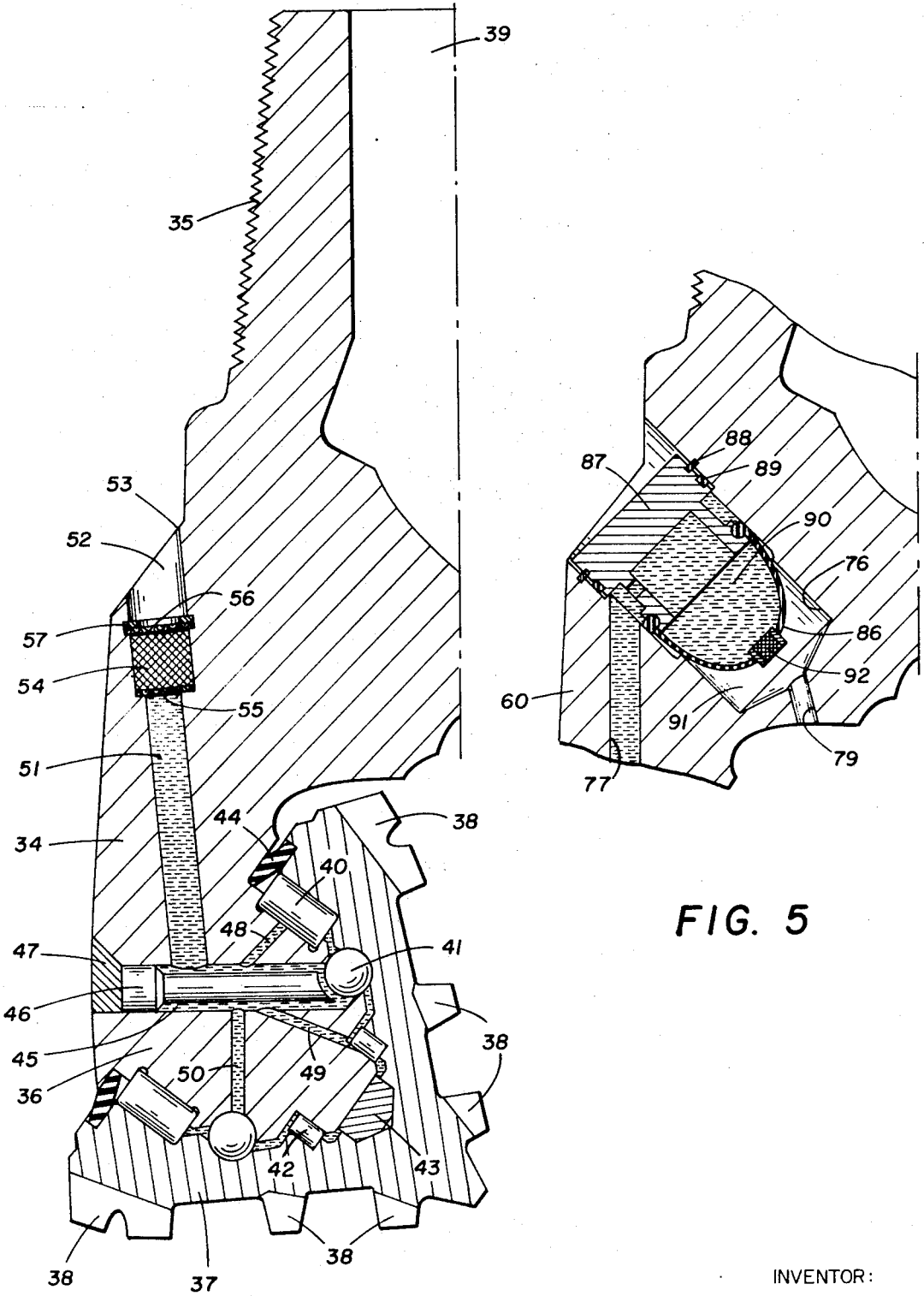
FIG. 3 is a sectional view of one arm of a sealed bearing rotary rock bit illustrating another embodiment of the present invention.
FIG. 5 illustrates another form of the flexible diaphragm of the embodiment of the invention shown in FIG. 4.

Another form of the flexible diaphragm is shown in FIG. 5. The flexible diaphragm 86 may be positioned in the lubricant reservoir 76 of the bit 58 shown in FIG. 4. The flexible diaphragm 86 is held in place in the arm 60 of bit 58 by a solid cap 87 that is locked in the reservoir 76 by a snap ring 88. An O-ring seal 89 prevents fluid from bypassing the cap 87 and lubricant within the lubricant portion 90 of the reservoir 76 is channeled through passageway 77 to the bit bearings. Fluid in the borehole may enter the pressure equalizing portion 91 of the reservoir 76 through passageway 79. A free breathing porous filter plug 92 extends through the flexible diaphragm 86. The plug 92 provides fluid communication between lubricant in the lubricant portion 90 of the reservoir 76 and fluid from the borehole that has entered the pressure equalizing portion 91 of the lubricant reservoir 76. The plug 92 is in the form of compressed metal particles positioned within an open metal cylinder.

The structural details of the bit 58 having been described, the operation of the bit 58 will now be considered. The lubrication system of the bit is filled with a suitable lubricant and the area above the flexible diaphragm 78 within the lubricant reservoir 76 is completely filled with the lubricant. The flexible diaphragm 78 seals the lower end of the lubricant reservoir 76 and is held in place by the lower portion of the cap 80. The bit 58 is lowered into a well bore until the cutter 62 contacts the earth formation at the bottom of the borehole. The hydrostatic pressure of fluid in the well bore is substantial and a pressure differential between the pressure of the lubricant inside of the bit 58 and the pressure of fluid in the borehole would ordinarily develop. However, the lubrication system of the present invention allows the pressure of fluid in the well bore to be transmitted to the lubricant in the lubricant reservoir 76 and the pressures are equalized as the bit 10 is moved through the borehole. Fluid in the borehole may enter the lubricant reservoir 76 through passageways 79 and 83. The flexible diaphragm 78 prevents fluid that enters through the passageway 79 from directly contacting the lubricant yet allows the pressure of the fluid to be transmitted directly to the lubricant. The free breathing porous filter plug 84 prevents any substantial amount of fluid in the well bore from entering the lubricant reservoir and the pressure of fluid in the well bore is transmitted directly to the lubricant.

During the drilling operation, the bit 58 is rotated and the cutting structure 63 of cutter 62 contacts and disintegrates the formations thereby extending the borehole deeper into the earth. As the temperature of the bit increases, the lubricant expands. Any internal pressure buildup of the lubricant is transmitted through the passageway 83 and the pressure of the lubricant in the shown, also allows the balls that make up the ball bearing system 20 to be inserted into position after the cone cutter 14 is placed on the bearing pin 18. The series of ball bearings 20 serves to lock the cone cutter 14 on bearing pin 18. After the balls are in place, a plug 25 is inserted into the passageway 24 and welded therein by weld 26. Plug 25 has a reduced diameter throughout the major portion of its length to allow lubricant to be transmitted to the bearing area. Additional passageways 27, 28 and 29 extend from passageway 224 to the bearing area to insure a sufficient supply of lubricant to bearings 19, 20, 21 and 22.

A lubricant reservoir 30 is located in the arm 13 to provide a supply of lubricant to the bearings. A passageway 31 connects the lubricant reservoir 30 with a vent on the external surface of the bit. A free breathing porous filter plug 32 is locked in place by snap ring 33 in the passageway 31 and provides a flow dampening effect that will restrict the penetration of turbulent fluids either into or out of the system. The plug 32 prevents any substantial amount of fluid flow into or out of the system in response to pressure demands and creates a dead-end trap whereby lubricant is retained inside of lubricant reservoir 30. The plug 32 shown in this embodiment of the invention is constructed of sintered metal but it is to be understood that the plug could be constructed in any manner that would produce a porous and permeable plug such as being constructed of a porous ceramic material, being in the form of a screen or being in the form of other well known filter structures.

The structural details of a bit constructed in accordance with the present invention having been shown, the operation of the bit will now be considered with reference to the bit of FIGS. 1 and 2. The bit 10 is lowered into a well bore until the cutters 14, 14′, 14″ contact the earth formation at the bottom of the borehole. The hydrostatic pressure of fluid in the well bore is substantial and a pressure differential between the pressure of lubricant inside of the bit 10 and the pressure of fluid in the borehole would ordinarily develop. The filter 32 allows the pressure of fluid in the well bore to be transmitted to the lubricant and the pressures are equalized as the bit 10 is moved through the borehole. The pressure differential encountered in prior art bits is thereby eliminated. The bit 10 is rotated and the cutters 14, 14′, 14″ and cutting structure 15, 15′, 15″ contact and disintegrate the formations thereby extending the borehole deeper into the earth. As the temperature of the bit increases, the lubricant expands. This also would ordinarily result in a pressure differential between the pressure of lubricant inside of the bit 10 and the pressure of fluid in the well bore; however, the filter 32 allows the pressure from the lubricant to be transmitted to the fluid in the borehole and the pressures are equalized. When a section of the drill string is added, the bit 10 is moved up and down in the borehole and changes in pressure are encountered. The filter 32 insures that the pressure of lubricant inside of the bit will be the same as the pressure of the fluid in the borehole proximate the bit 10 and the lubrication system is protected. The filter 32 prevents any substantial flow into or out of the bit and lubricant is retained inside of reservoir 30 in a substantially pure form.

Referring now to FIG. 3, a sectional view of one arm of a sealed bearing rotary rock bit illustrating another embodiment of the present invention is shown. As illustrated, the arm 34 depends from the upper portion of the bit. The bit includes an upper threaded portion 35 that allows the bit to be connected to the lower end of a rotary drill string (not shown). The lower end of the arm 34 is provided with an extended journal portion 36. A rotary cone cutter 37 is rotatably positioned upon the extended journal portion or bearing pin 36. The cutter 37 includes cutting structure 38 on its outer surface adapted to disintegrate the formations as the bit is rotated and moved downward. The cutting structure 38 is shown in the form of steel teeth. However, it is to be understood that other cutting structures such as tungsten carbide inserts may be used as the cutting structure on the cone cutter 37.

The bit includes a central passageway 39 extending along the central axis of the bit to allow drilling fluid to enter from the upper section of the drill string (not shown) immediately above and pass downward to the bottom of the well bore to flush cuttings and drilling debris from the well bore. A plurality of bearing systems are located in the bearing area between the cutter 37 and the bearing pin 36. The bearing systems in the bearing area include a series of roller bearings 40, a series of ball bearings 41, a friction bearing 42 and a thrust button 43. A seal 44 is positioned between the cutter 37 and the bearing pin 36. The seal 44 retains lubricant in the bearing area around bearing systems and prevents any materials in the well bore from entering the bearings. The seal 44 is designed to hold pressure in one direction only, that being from the fluid in the well bore to the bearing area. If the pressure of lubricant inside of the bit reaches 50 to 75 p.s.i. greater than the pressure on the outside of the bit, lubricant will be forced out past the seal 44 into the well bore. In prior art rotary rock bits, the pressure inside of the bit would build up periodically resulting in pressure pulses forcing lubricant out past the seal reducing the useful lifetime of the bit. The lubrication system of the present invention insures that the pressure of lubricant inside of the bit will be substantially the same at all times as the hydrostatic pressure of fluid in the well bore thereby preventing any pressure differential across the seal 44 and insuring that the lubricant will be retained in the bearing area.

The lubrication system includes a passage 45 that extends through the bearing pin 36 to the bearing area to allow lubricant to be transmitted to the bearing systems. The passage 45, as shown, also allows the balls that make up the ball bearing system 41 to be inserted into position after the cone cutter 37 is placed on the bearing pin 36. The series of ball bearings 41 serves to lock the cone cutter 37 on bearing pin 36. After the balls are in place, a plug 46 is inserted into the passage 45 and welded therein by weld 47. Plug 46 has a reduced diameter throughout the major portion of its length to allow lubricant to be transmitted to the bearing area. Additional passages 48, 49 and 50 extend from passage 45 to the bearing area to insure a sufficient supply of lubricant to bearings 40, 41, 42 and 43.

A lubricant reservoir 51 is located in the arm 34 of the bit to provide a supply of lubricant to the bearings. A passage 52 connects the lubricant reservoir 51 with a vent 53 on the external surface of the bit. A free breathing porous filter plug 54 is positioned in the passage 52 closing the upper end of the lubricant reservoir 51. The free breathing porous filter plug 54 is positioned between a pair of screens 55 and 56 and screen 56 is locked in place in passage 52 by a snap ring 57. The snap ring 57 and screen 56 insure that the plug 54 will be firmly held in place in the arm 34 of the bit throughout the lifetime of the bit. It is to be understood that the screens are necessary only when the plug 54 is constructed of loose material such as metal shavings or particles. The free breathing porous filter plug 54 consists of particles of sintered metal that fill the area between screens 55 and 56. However, it is to be understood that the plug 54 could be constructed in any manner that would produce a porous and permeable plug. For example, the plug 54 could be constructed of a porous ceramic material, could be in the form of a screen or in the form of other well known filter structures. The free breathing porous filter plug 54 provides a flow dampening effect that will restrict the penetration of turbulent fluids either into or out of the system. The plug 54 prevents any substantial amount of fluid flow into or out of the system in response to pressure demands and creates a dead-end trap whereby lubricant is retained inside of the bit.

lubricant reservoir 76 and the pressure of fluid in the well bore are equalized. When a section of the drill string is added, the bit 58 is moved up and down in the borehole and changes in pressure are encountered. The passageways 79 and 83, the flexible diaphragm 78 and the free breathing porous filter plug 84 insure that the pressure of lubricant inside the bit will be the same as the pressure of the fluid in the borehole proximate the bit 58 thereby protecting the lubrication system. The free breathing porous filter plug 84 prevents any substantial flow into or out of the lubrication system and lubricant is retained within the bit in a substantially pure form.

When the flexible diaphragm 86 shown in FIG. 5 is used, the bit 58 operates in the manner previously described. The pressure of fluid in the borehole and the pressure of lubricant in the lubricant portion 90 of the reservoir 76 are equalized by borehole fluid that enters the pressure equalizing portion 91 of the reservoir 76. A limited volume of fluid or lubricant can pass through the plug 92 to insure that the pressure of lubricant inside of the bit 58 is the same as the pressure of the fluid in the borehole.

The embodiments of the invention in which an exclusive property or privilege is claimed are defined as follows:

1. A drill bit comprising:
a bit body, said bit body including at least one bearing pin and said bit body defining
an internal chamber,
a first passageway that connects said internal chamber with an area on the surface of said bearing pin, and
a second passageway that places said internal chamber in fluid communication with the outside of the bit;
a cutter mounted upon said bearing pin;
bearing means between said cutter and said bearing pin for promoting rotation of said cutter; and
filter means in said second passageway for restricting flow into or out of said bit.

2. The bit of claim 1 including seal means for providing closure between said cutter and said bit body.

3. The bit of claim 2 wherein said seal means prevents flow in both directions.

4. The bit of claim 2 wherein said seal means is a positive seal in one direction only.

5. The bit of claim 2 wherein said bearing means includes a series of ball bearings.

6. The bit of claim 2 wherein said bearing means includes a series of roller bearings.

7. The bit of claim 2 wherein said bearing means includes at least one friction bearing.

8. The bit of claim 2 including a flexible diaphragm positioned in said internal chamber.

9. A drill bit with lubricant inside of the bit and adapted to operate with fluid outside of the bit, comprising:
a bit body, said bit body including at least one bearing pin and said bit body defining
an internal chamber containing lubricant,
a first passageway that connects said internal chamber with the outside of said bearing pin to channel lubricant from said internal chamber to the area outside of said bearing pin, and
a second passageway that places said internal chamber in fluid communciation with the outside of the bit to transmit fluid pressure between the outside and the inside of the bit;
a rotatable cone cutter mounted upon said bearing pin;
bearing means between said rotatable cone cutter and said bearing pin for promoting rotation of said rotatable cone cutter;
seal means between said rotatable cone cutter and said bit body for retaining lubricant inside of the bit and for preventing fluid outside of the bit from entering the bit; and
filter means in said second passageway for limiting the amount of fluid flow into or out of the bit.

10. The bit of claim 9 wherein said seal means prevents flow in both directions.

11. The bit of claim 9 wherein said seal means prevents flow in one direction only.

12. The bit of claim 9 wherein said bearing means includes a series of ball bearings.

13. The bit of claim 9 wherein said bearing means includes a series of roller bearings.

14. The bit of claim 9 wherein said bearing means includes at least one friction bearing.

15. The bit of claim 9 including a flexible diaphragm positioned in said internal chamber dividing said internal chamber into a lubricant portion and pressure transmitting portion.

16. The bit of claim 15 including a passageway in said bit body that connects said pressure transmitting portion of said internal chamber with the outside of said bit.

17. A drill bit comprising:
a main bit body;
three individual arms extending from said bit body, each of said arms including a bearing pin;
a rotatable cutter mounted upon each of said bearing pins;
bearing means between each of said cutters and said bearing pins;
a seal between each of said cutters and said bearing pins;
a lubricant reservoir in each of said arms;
a lubricant passage in each of said arms extending from said lubricant reservoirs to said bearing means;
a vent passage in each of said arms communicating said lubricant reservoirs with an area on the external surface of said arms; and
a free breathing porous filter plug positioned in each of said vent passages.

18. The bit of claim 17 wherein said seals prevent fluid flow in either direction.

19. The bit of claim 17 wherein said seals prevent fluid flow in one direction only.

20. The bit of claim 17 wherein said bearing means include a series of ball bearings.

21. The bit of claim 17 wherein said bearing means include a series of roller bearings.

22. The bit of claim 17 wherein said bearing means include at least one friction bearing.

23. The bit of claim 17 including a flexible diaphragm positioned in said lubricant reservoir.

24. A sealed bearing rotary rock bit containing lubricant inside of the bit and adapted to operate in a fluid environment by the rotation of a rotary drill string, comprising:
a bit body;
a connection for connecting the bit body to a rotary drill string;
at least one arm extending from said bit body, said arm terminating in a bearing pin;
a rotatable cone cutter rotatably mounted upon said bearing pin;
bearing means between said rotatable cone cutter and said bearing pin for promoting rotation of said rotatable cone cutter;
seal means for providing a closure between said rotatable cone cutter and said bearing pin thereby retaining the lubricant inside of the bit and preventing fluid outside of the bit from entering the bit;
a lubricant reservoir in said arm;
a flexible diaphragm in said lubricant reservoir, said flexible diaphragm dividing the lubricant reservoir into a lubricant portion and a pressure equalizing portion;

means for transmitting the pressure of the fluid environment to said pressure equalizing portion of said lubricant reservoir; and porous filter means for transmitting the pressure of the fluid environment to said lubricant portion of said lubricant reservoir.

25. The bit of claim 24 wherein said means for transmitting the pressure of the fluid environment to said pressure equalizing portion of said lubricant reservoir is a passage through said arm connecting said presure equalizing portion with said fluid environment and said porous filter means includes a porous filter plug positioned in a passage that communicates the lubricant portion of said lubricant reservoir with the fluid environment.

26. The bit of claim 24 wherein said means for transmitting the pressure of the fluid environment to said pressure equalizing portion of said lubricant reservoir is a passage through said arm connecting said pressure equalizing portion with said fluid environment and said porous filter means includes a porous filter plug extending through said flexible diaphragm thereby communicating the lubricant portion of said lubricant reservoir with said pressure equalizing portion and said fluid environment.

References Cited

UNITED STATES PATENTS

| | | | |
|---|---|---|---|
| 2,880,970 | 4/1959 | Swart | 175—337 |
| 3,096,835 | 7/1963 | Neilson | 175—228 X |
| 3,105,563 | 10/1963 | Havenaar | 175—337 |
| 3,137,508 | 6/1964 | Cunningham | 308—812 X |
| 3,230,020 | 1/1966 | Gilbert et al. | 175—228 X |
| 3,534,823 | 2/1969 | Frederick | 175—337 |
| 3,476,195 | 11/1969 | Galle | 175—228 |
| 3,663,073 | 5/1972 | Bronson | 308—8.2 |
| 3,666,329 | 5/1972 | Bell | 308—8.2 |

DAVID H. BROWN, Primary Examiner

U.S. Cl. X.R.

175—372